United States Patent
Walden

(10) Patent No.: US 9,092,912 B1
(45) Date of Patent: Jul. 28, 2015

(54) APPARATUS AND METHOD FOR PARALLAX, PANORAMA AND FOCUS PULL COMPUTER GRAPHICS

(71) Applicant: Madefire, Inc., Berkeley, CA (US)

(72) Inventor: Eugene Walden, San Anselmo, CA (US)

(73) Assignee: Madefire, Inc., Berkeley, CA (US)

( * ) Notice: Subject to any disclaimer, the term of this patent is extended or adjusted under 35 U.S.C. 154(b) by 233 days.

(21) Appl. No.: 13/923,275

(22) Filed: Jun. 20, 2013

Related U.S. Application Data

(60) Provisional application No. 61/662,277, filed on Jun. 20, 2012.

(51) Int. Cl.
| | | |
|---|---|---|
| *G09G 5/00* | (2006.01) | |
| *G06T 15/00* | (2011.01) | |
| *G06F 13/14* | (2006.01) | |
| *G06T 13/00* | (2011.01) | |
| *G06F 15/16* | (2006.01) | |
| *G06T 11/60* | (2006.01) | |
| *H04L 29/08* | (2006.01) | |

(52) U.S. Cl.
CPC .......... *G06T 11/60* (2013.01); *H04L 29/08072* (2013.01); *G06T 15/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,866,841 | B1 * | 10/2014 | Distler | 345/619 |
| 2004/0039934 | A1 * | 2/2004 | Land et al. | 713/200 |
| 2005/0088458 | A1 * | 4/2005 | Marrin et al. | 345/629 |
| 2007/0216975 | A1 * | 9/2007 | Holmes | 359/2 |
| 2012/0050833 | A1 * | 3/2012 | Bove et al. | 359/26 |

* cited by examiner

Primary Examiner — Wesner Sajous
(74) Attorney, Agent, or Firm — Cooley LLP

(57) ABSTRACT

A computer has a network interface circuit to support communications with a client device. A memory is connected to the processor. The memory stores instructions executed by the processor to supply an authoring tool to the client device. The authoring tool is configured to solicit a sequence of image layers that form a composite image and image layer visualization parameters including a parallax parameter that specifies a range of horizontal motion or a range of vertical motion for an individual image layer, panorama parameters that specify individual images to be assigned to individual cube faces, and a focus pull parameter that specifies a blur parameter to be assigned to an individual image layer.

10 Claims, 8 Drawing Sheets

APPARATUS AND METHOD FOR PARALLAX, PANORAMA AND FOCUS PULL COMPUTER GRAPHICS

CROSS-REFERENCE TO RELATED APPLICATION

This application claims priority to U.S. Provisional Patent Application 61/662,277, filed Jun. 20, 2012, the contents of which are incorporated herein by reference.

FIELD OF THE INVENTION

This invention relates generally to computer graphics. More particularly, the invention relates to techniques for implementing parallax, panorama and focus pull computer graphics.

BACKGROUND OF THE INVENTION

There are many available tools for authoring sophisticated computer graphics. However, these tools tend to rely upon abundant processor power and are otherwise configured for a sophisticated, if not professional, computer animator.

Therefore, it would be desirable to provide an authoring tool that can be used on a client device with relatively small processing power. Ideally, the authoring tool would enable a relatively unsophisticated computer animator to create rich multimedia presentations.

SUMMARY OF THE INVENTION

A computer has a network interface circuit to support communications with a client device. A memory is connected to the processor. The memory stores instructions executed by the processor to supply an authoring tool to the client device. The authoring tool is configured to solicit a sequence of image layers that form a composite image and image layer visualization parameters including a parallax parameter that specifies a range of horizontal motion or a range of vertical motion for an individual image layer, panorama parameters that specify individual images to be assigned to individual cube faces, and a focus pull parameter that specifies a blur parameter to be assigned to an individual image layer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
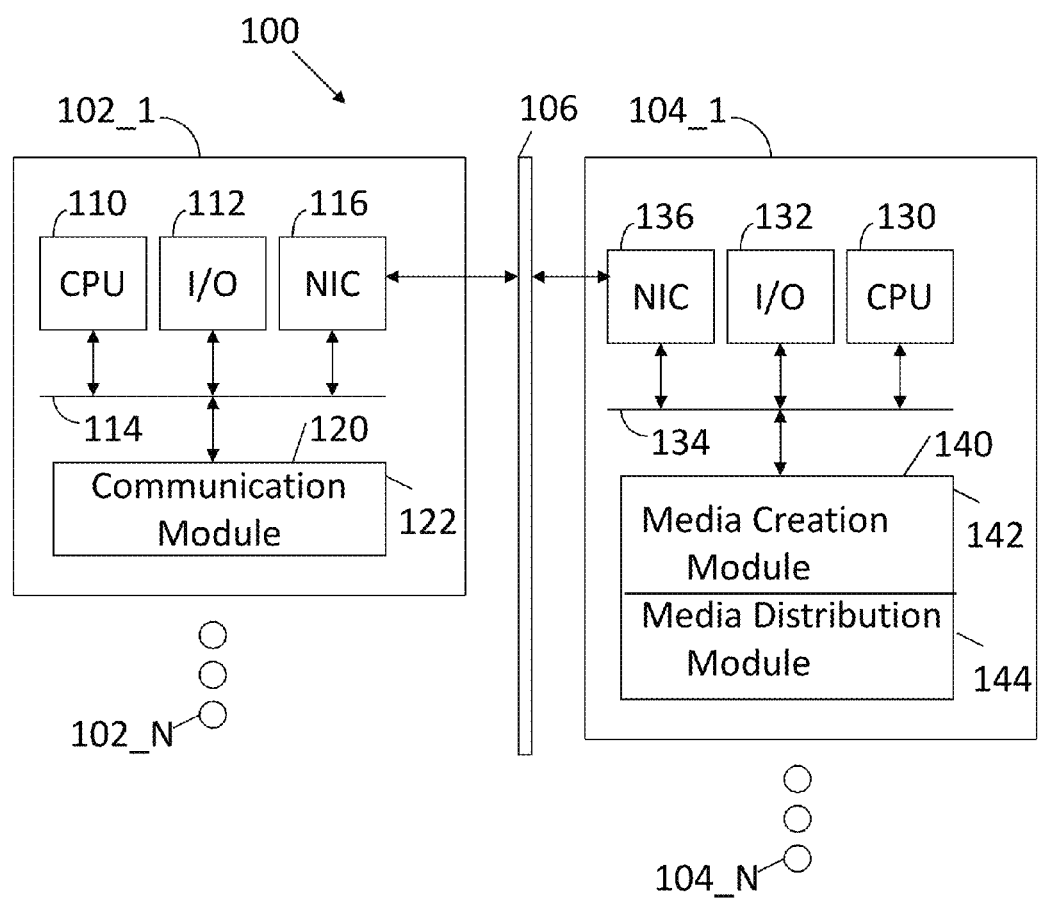
FIG. 1 illustrates a system configured in accordance with an embodiment of the invention.

FIG. 1 illustrates a system 100 configured in accordance with an embodiment of the invention. The system 100 includes a set of client devices 102_1 through 102_N connected to one or more servers 104_1 through 104_N via a network 106, which may be any wired or wireless network. Advantageously, each client device 102 may be a relatively "thin" device with limited computing power, such as a tablet. The client device 102 has standard components, such as a central processing unit 110 connected to input/output devices 112 via a bus 114. The input/output devices 112 may include a touch display, a keyboard, mouse, speaker and the like. A network interface circuit 116 provides connectivity to network 106. A memory 114 is also connected to the bus 114. The memory 122 stores a communication module 122. The communication module 122 may be a browser or dedicated application for communicating with one or more servers implementing operations of the invention.

Each server 104 also includes standard components, such as a central processing unit 130 connected to input/output device 132 via a bus 134. A network interface circuit 136 is also connected to bus 134. A memory 140 stores executable instructions to implement operations of the invention. In one embodiment, the memory 140 stores a media creation module 142 and a media distribution module 144, the operations of which are described below. The operations of the invention may be implemented on a single server 104_1 or a set of servers 104_1 through 104_N.

Figure 2:
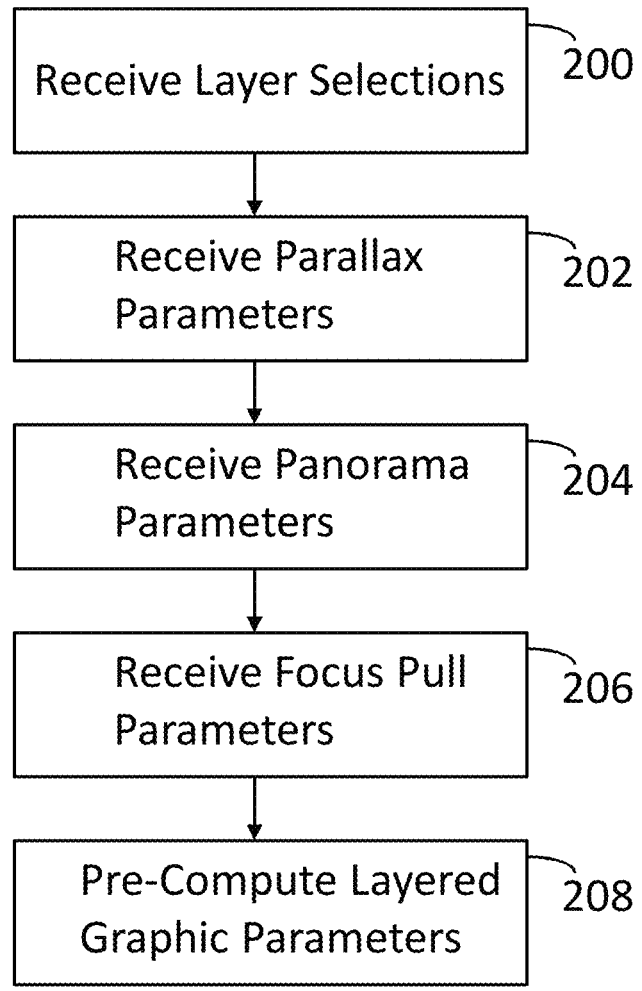
FIG. 2 illustrates media creation operations performed in accordance with an embodiment of the invention.

FIG. 2 illustrates processing operations associated with an embodiment of the media creation module 142. As will be shown below, the media creation module 142 provides interfaces to receive layered images 200. The individual layered images may then be assigned various parameters. For example, parallax parameters may be received 202. Parallax refers to the difference in apparent position of an object viewed from different lines of sight. Parallax is an effect that may be used to simulate dimensionality without implementing full-three dimensional modeling. In an embodiment of the invention, the parallax parameters include a specified range of horizontal motion for individual layered images and a specified range of vertical motion for individual layered images.

Panorama parameters may also be received 204. As discussed below, these parameters may include cub face parameters, images assigned to cube face parameters and panoramic thought balloons.

Focus pull parameters may also be received 206. The focus pull parameters create visual effects to direct a viewers attention to certain areas of an image. In one embodiment, the focus pull parameters include image blur parameters of individual layered images.

Based upon the received parameters, layered graphic parameters are pre-computed 208. This is done on the server so essentially unlimited computation power is available, even though a thin client device may have been used to input the parameters.

Figure 3:
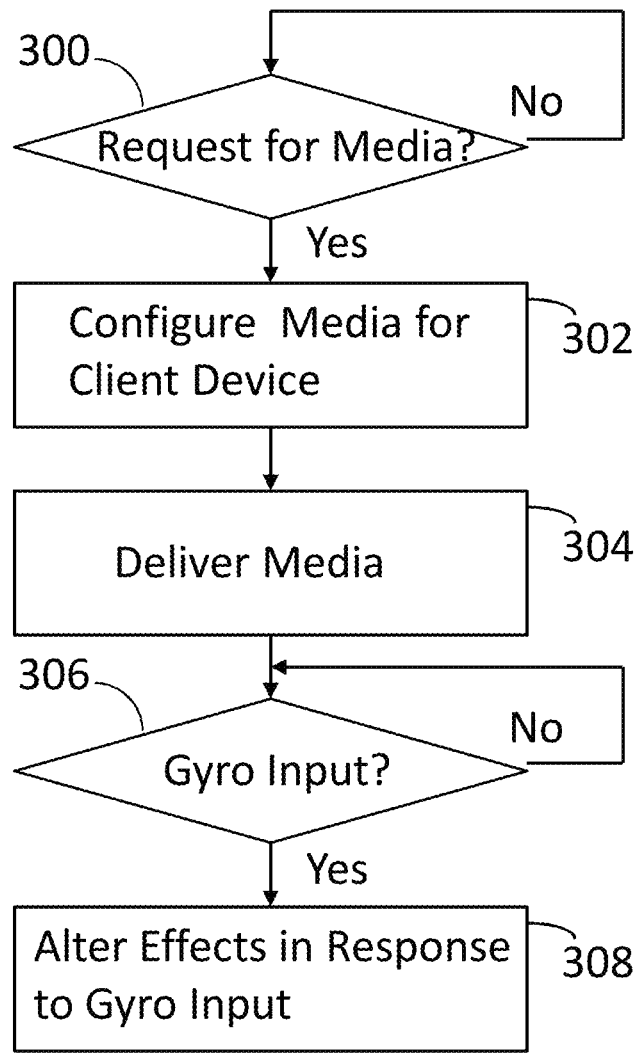
FIG. 3 illustrates media distribution operations performed in accordance with an embodiment of the invention.

FIG. 3 illustrates processing operations associated with a media distribution module 144. The media distribution module 144 waits for a request for media 300. The media 300 is a work created with the media creation module 142. If media is requested (300—Yes), then the media is configured for a client device 302. That is, the media distribution module 144 selects a version of the media that is optimized for the client device associated with the request. The media is then delivered 304 across network 106. In one embodiment, gyroscope signals associated with the client 102 are monitored. If a gyroscope signal is present (306—Yes), then effects associated with the media are altered 308.

Figure 4:
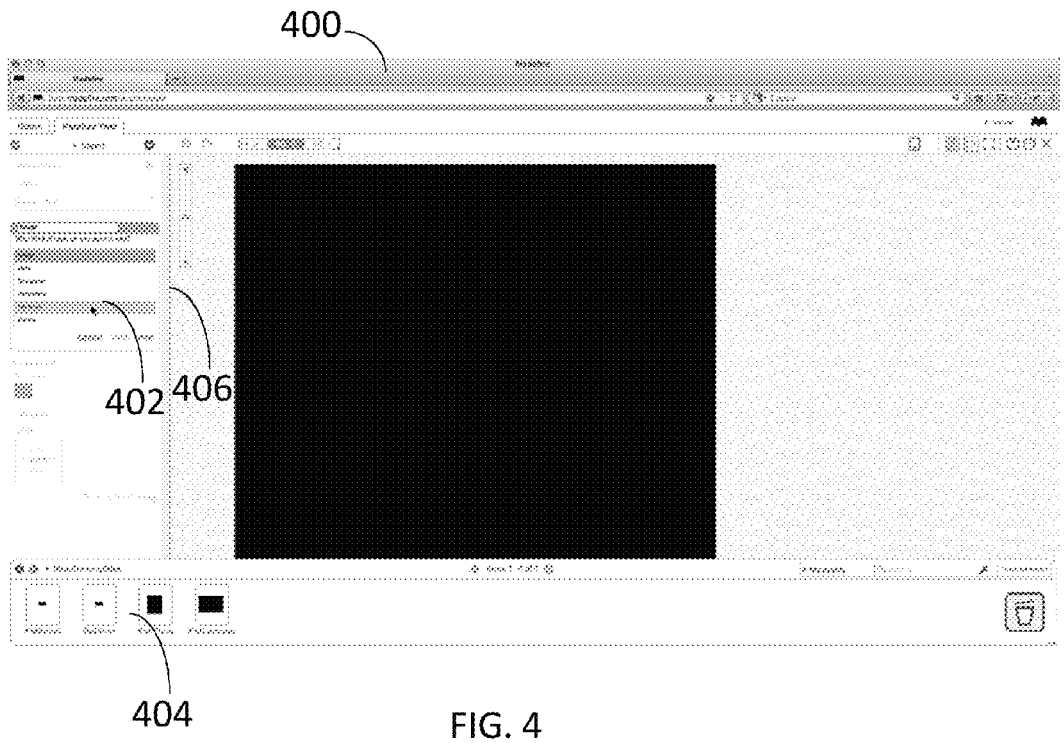
FIGS. 4-12 illustrate user interfaces utilized in accordance with embodiments of the invention.

The foregoing operations are more fully appreciated in connection with specific examples. The disclosed technology includes an authoring tool that provides a streamlined environment for creating parallax scenes for animated stories. The animated stories may then be deployed on a client device, such as an iPad® or other tablet. FIG. 4 illustrates an interface 400 that allows one to select a parallax effect 402. The interface 400 may include a set of templates 404.

Figure 5:
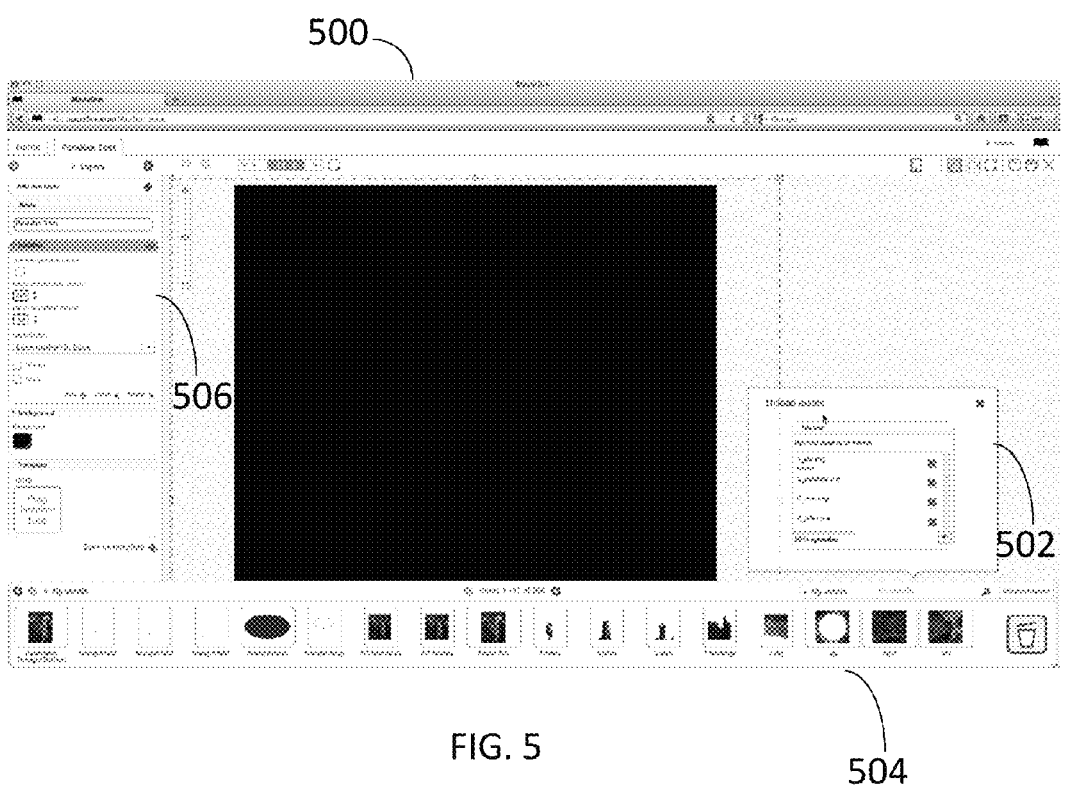

FIG. 5 illustrates a user interface 500 with an image upload tool 502. The image upload tool 502 allows a user to import individual layered images, which may then be populated in window 504. Parallax parameters may then be specified through control panel 506. For example, a new layer may be created and the layer may be specified to be of type parallax. That creates a container. In one embodiment, the layers are loaded from the work environment into cloud base storage implemented with servers 104. In one embodiment, these are all Portable Network Graphics (PNG) files with transparency.

Figure 6:
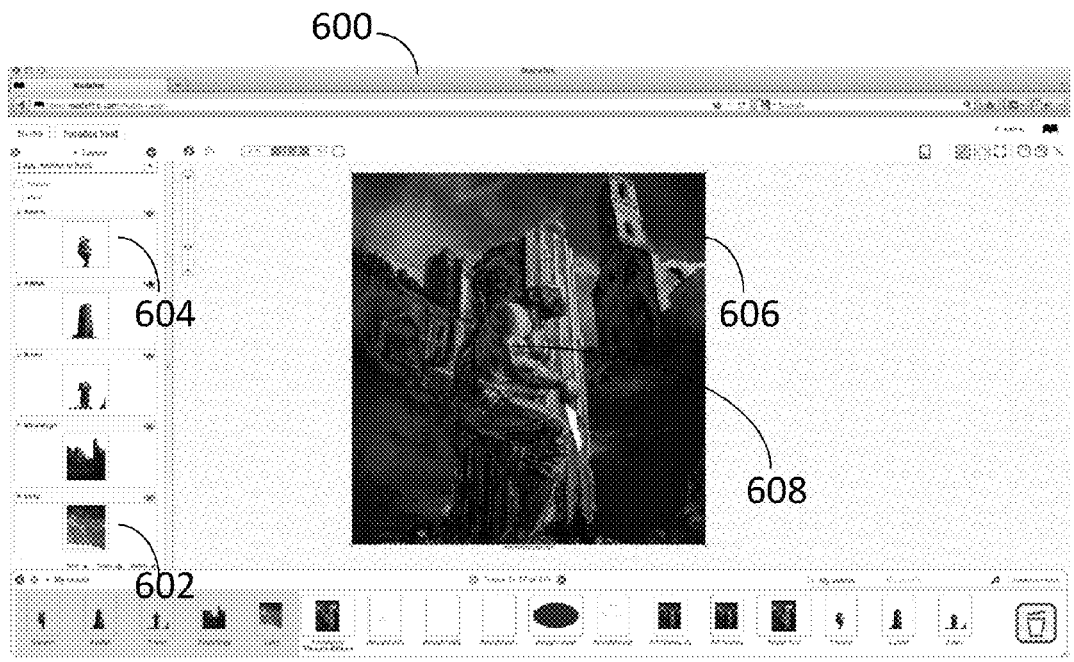

The layers may be selected back to front, such as sky, buildings, men, pillar and a central character Mono. They may then be dragged and dropped into the parallax layer, which then creates all the layouts and calculates the relative depths based on parallax. FIG. 6 illustrates an interface 600 demonstrating this functionality. The individual layers proceed from sky 602 (in back) to Mono (in front) 604. The composite image 606 is also illustrated.

The layers have been loaded on to stacks. These layers comprise the scene. Parallax provides motion so that the character and the layer on the front moves more than the layers in the back. This simulates how we perceive motion in the physical world. Default motion settings may be used for the parallax motion. In one embodiment, the character in the front moves more than the sky layer in the back. This provides depth perception.

Based on depth or based on the order, layers are loaded. The image on top moves the most, it's assumed to be closest to the viewer and the layer on the back moves the least. All kinds of fine-tune settings may be used. For example, a depth effect may be specified. In one embodiment, the default is linear with the amount of total motion being 200 pixels in the horizontal dimension and 20 in the vertical dimension. The layer in front may move a full 200 pixels and the layer in the very back may not move at all. One can choose depth effects. One can specify less motion in back, which results in a differential in motion that is a little bit more pronounced. This example puts most of the motion in the front and the background layers move much more slowly. This has the effect of pushing the layers in back further into the distance.

One can adjust the range of horizontal motion. If 400 pixels is specified, the character Mono 608 will really move quite a bit left to right. One can specify that the character does not move at all in the vertical dimension. In this case, the parallax is strictly horizontal. Alternately, vertical motion can be specified to produce a bounce effect.

Controls can be implemented with gestures. For instance, one can click and drag in order to trigger the motion and one can also link these to the gyroscope or the accelerometer of the client device. By default, motion may be linked directly to the gyroscope of the client device. Thus, in just a couple of steps, one can drag and drop some layers, play around with some defaults and publish to the media distribution module 144. Thereafter, one has a gyroscope triggered very immersive dimensional experience. In one embodiment, the files sizes and the formats on the server are optimized for the size of the client device.

Figure 7:
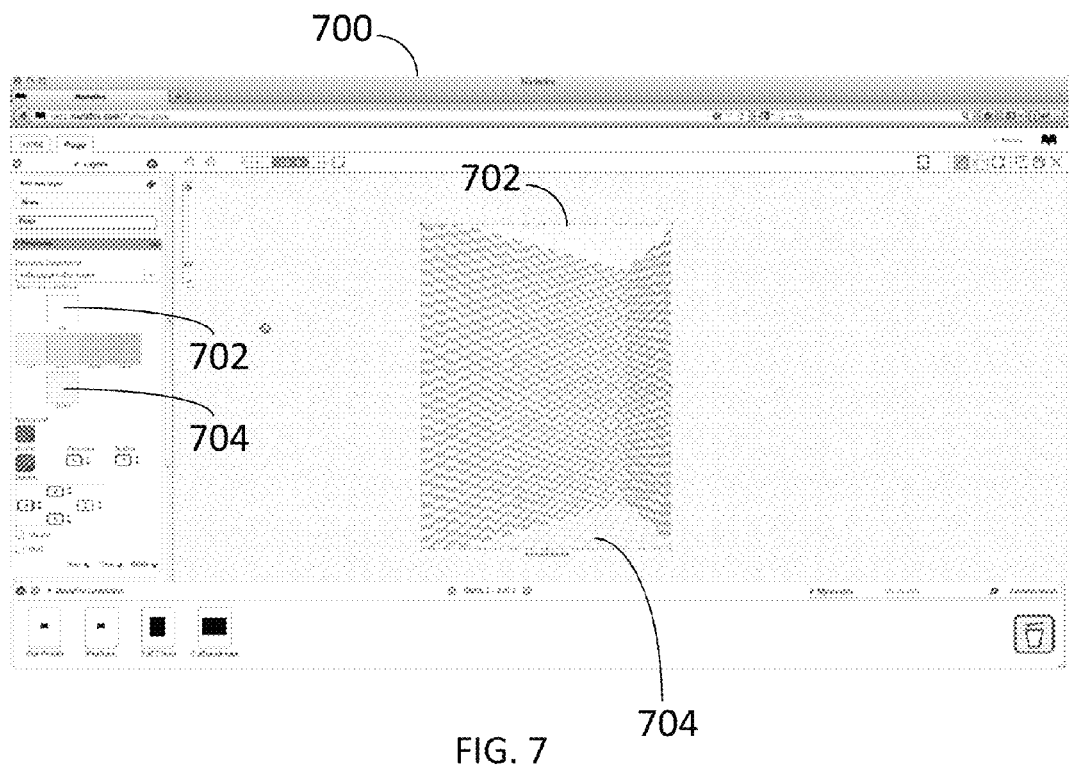

Another aspect of the invention is a panoramic feature that is used for publishing panoramas in a story context. FIG. 4 illustrates a panorama tool option 406. Selection of this option may result in a user interface 700, such as shown in FIG. 7. User interface 700 provides cube faces, such as cube faces 702 and 704. The cube faces are the projections of a spherical camera at the center of an environment. There are also other formats that may be used in accordance with embodiments of the invention. For example, one may use rectangular, cubic, spherical and other formats.

Figure 8:
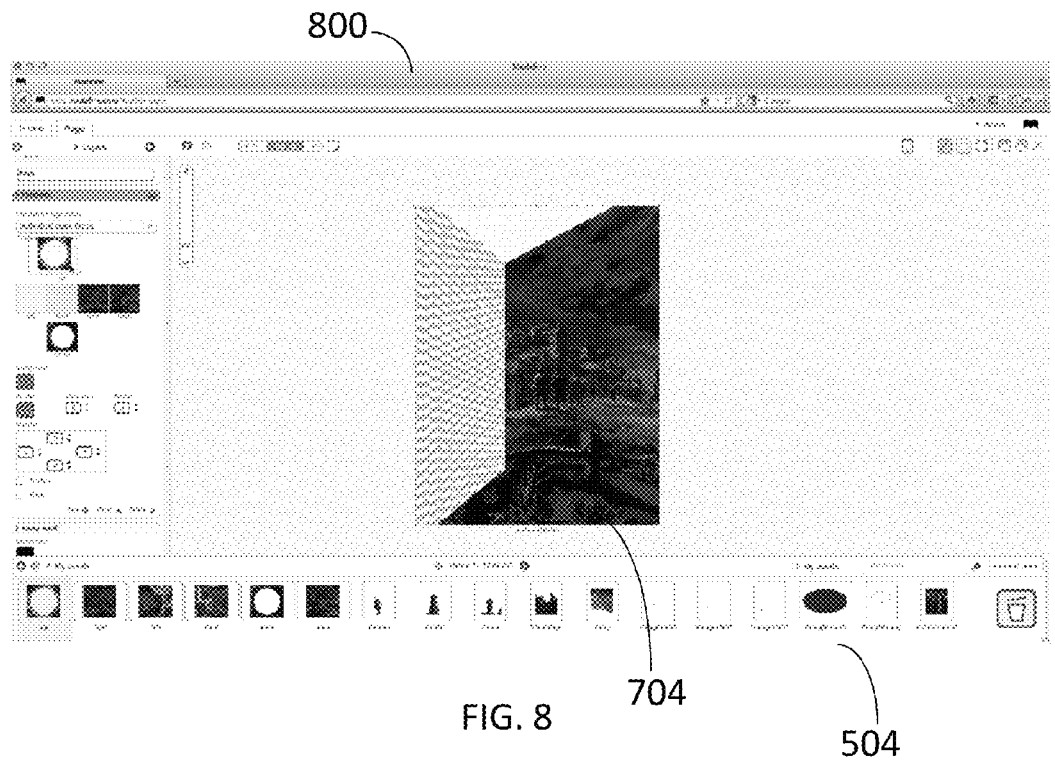

A panorama may be uploaded to a client device so that the actual panorama generation happens elsewhere, such as at a server 104. In the example of FIG. 7, six cube faces are uploaded. The cube faces are stored in a cloud-based asset management system. The cube faces may be dragged and dropped into the panorama control area. For example, FIG. 8 illustrates a user interface 800, which allows a cube face 702 to receive an image from image library 504.

Figure 9:
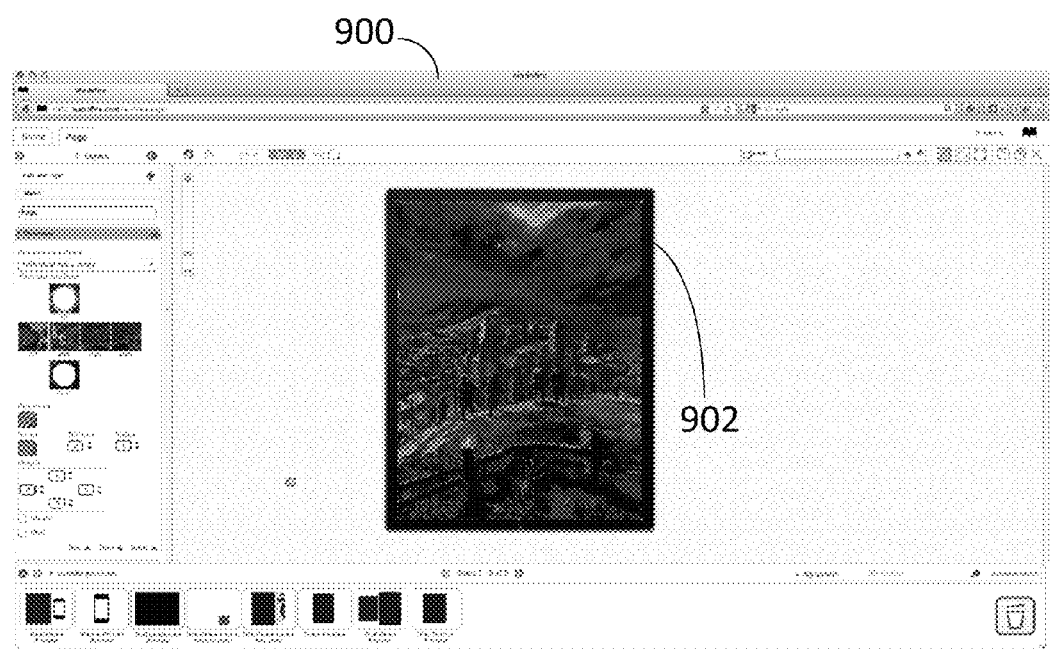

On a tablet, one may use a swipe gesture to rotate. One can also link the rotation and link the angle of view with the gyroscope of the tablet. So rather than swiping, one can simply move a tablet around and seat it in parts of the scene. FIG. 9 illustrates an interface 900 where all of the cube faces are populated to create a complete image 902.

Observe that this is fully automated. These images may be optimized on the server. Therefore, when a page is published for viewing it may be reformatted to be optimized for different client devices. For example, the screen resolution may be defined at 2,048 by 2,048 or by 1,024 by 1,024 or other resolutions.

The disclosed panoramas can be mixed, matched and combined. So, for instance, a panorama need not be a full screen size. One can make a smaller panorama that appears within another story. So, for instance, a panorama can be used as an overlay. For example, a border may be specified and a panorama may be populated in the border.

Figure 10:
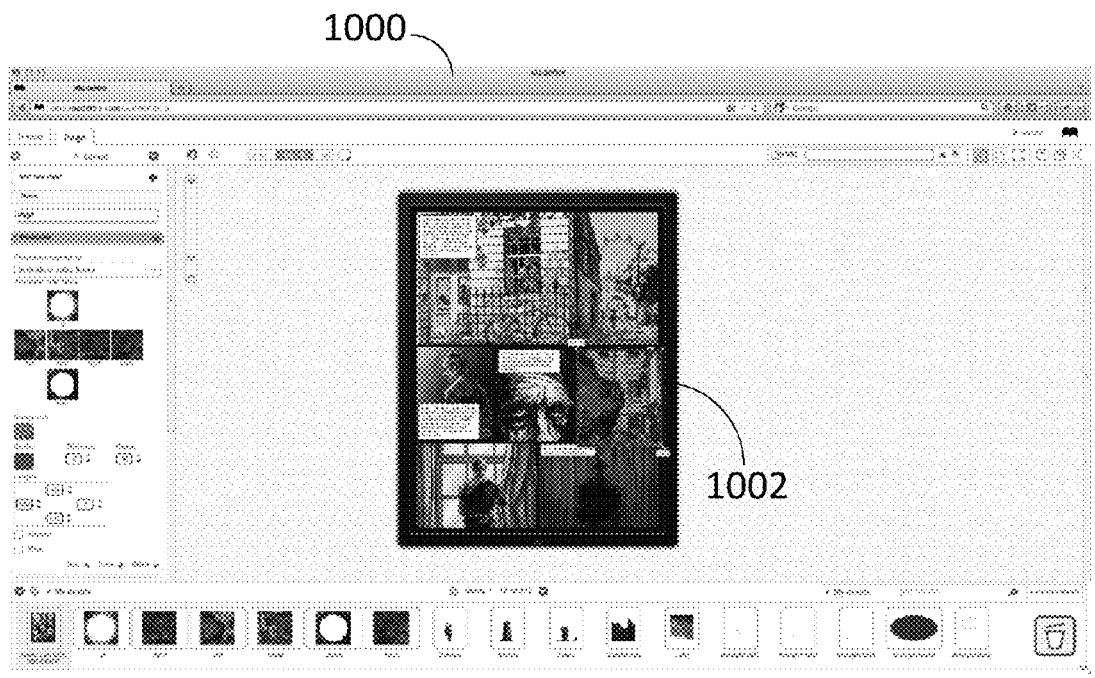

FIG. 10 illustrates a comic book that's more traditional in construction with a typical panel-based layout. A panorama may be used as a panel 1002, as opposed to a static image. This is a dramatic step forward in what's possible for visual storytelling since one can bring motion into what would typically be a sequence of flat images. One can also zoom in, zoom out and pan around the scene.

Figure 11:
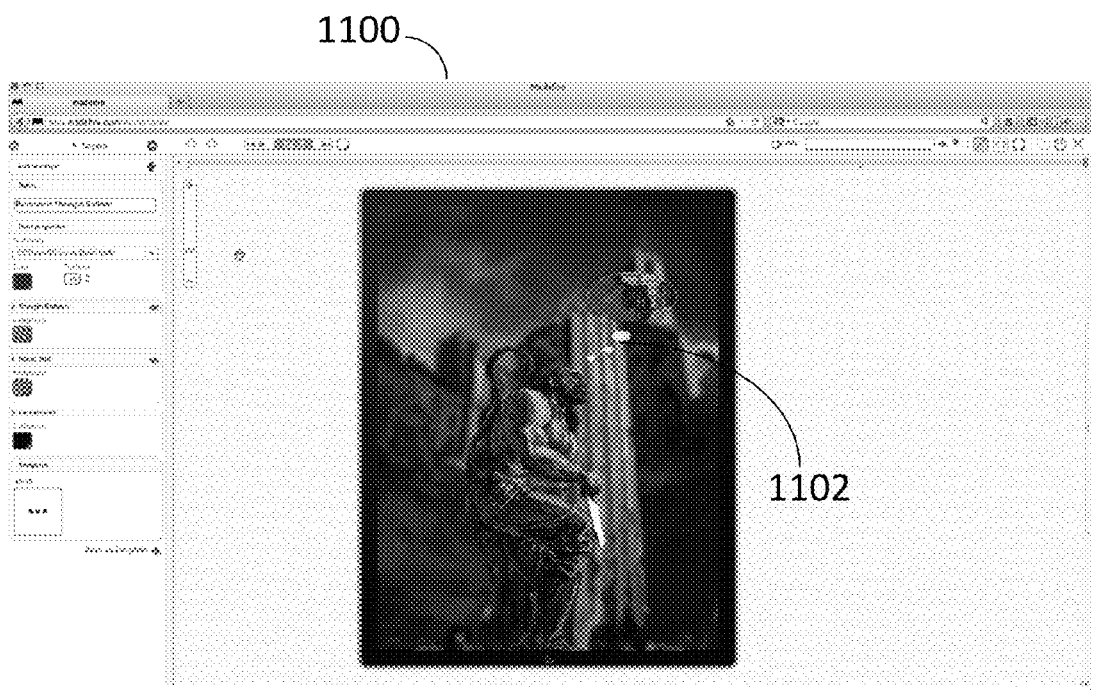

FIG. 11 provides another example of what is possible with the panorama. The figure shows an interface 1100 with a panoramic thought balloon 1102. Thus, a panorama may populate the thought balloon.

When processing is performed on the server side, various optimizations may be implemented prior to downloading to a client device. These optimizations exploit server power and reduce transmission bandwidth.

Focus pull parameters may also be utilized in accordance with an embodiment of the invention. Focus pull is a depth of field effect. For instance, if you're looking at a wide shot of a scene, the focal point can be adjusted to focus on a character, focus on the background or go between characters. The focal point leads the eye and tells a story in a very powerful way. Depth of field is one of the most fundamental tools of a cinematographer or a photographer.

The technical constraint on a tablet, such as the iPad®, is that there is no native ability to blur layers or if there is the ability to blur layers the performance impact is so high that it cannot be done at a full frame rate. So, in order to simulate this one needs to pre-render blurs and use opacity and fade to simulate the focus pull effect. An embodiment of the invention has a simple way of doing this.

Figure 12:

FIG. 12 illustrates an authoring tool 1200 that may be used in accordance with an embodiment of the invention. The authoring tool has a set of layers in depth order from back 1202 to front 1204. There is an automatically computed layer that is called defocus, which is used to blur out the background.

So, the workflow is that the author drags in the various layers and then the authoring tool pre-computes a blurred version. The Z-axis ordering of the layers gives the authoring tool an indication of how they should be modeled in terms of depth in a real environment. The blur is pre-computed. There is a slight blur that's applied to the pillar since that's the closest to the eye and the sky gets a large blur since that is further out.

To simulate a cinematic focus pull, a focus pull effect is applied to a layer. In one embodiment, the blurs are pre-computed. For example, a Gaussian blur may be applied to each layer. For example, the pillar may be the first layer that gets defocused and that gets a Gaussian blur with a radius of three since it is the closest to the viewer. This is just a little bit of a blur. Another layer gets a Gaussian blur with a radius of five since it is further out. The buildings get a Gaussian blur with a radius of seven and the last layer gets a Gaussian blur with a radius of nine. The end result is an effect that animates the focus. Animating the focus takes pre-computed blurs, places them on a display list and then fades in on the top of the background layers but beneath the layer that is specified to get the focus.

In one embodiment, focus layers are computed at a server and are downloaded to a client device, such as a tablet. Each layer may be optimized for the target device. The focus pull can be animated or linked to the gyroscope of a tablet. Animation may be in the form of a timed effect.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer, comprising:
a network interface circuit to support communications with a client device;
a processor; and
a memory connected to the processor, wherein the memory stores instructions executed by the processor to supply an authoring tool to the client device, wherein the authoring tool is configured to solicit:
a sequence of image layers that form a composite image, and
image layer visualization parameters including a parallax parameter that specifies a range of horizontal motion or a range of vertical motion for an individual image layer, panorama parameters that specify individual images to be assigned to individual cube faces, and a focus pull parameter that specifies a blur parameter to be assigned to an individual image layer.

2. The computer of claim 1 wherein the instructions include instructions to pre-compute layered graphic parameters to form an authored work.

3. The computer of claim 2 wherein the instructions include instructions to download the authored work to the client device.

4. The computer of claim 2 wherein the instructions to download include instructions to configure the authored work for the display attributes of the client device.

5. The computer of claim 2 wherein the image layer visualization parameters of the authored work are responsive to motion signals generated by the client device.

6. The computer of claim 1 wherein the image layer visualization parameters are selected in response to motion signals generated by the client device.

7. The computer of claim 1 wherein the image layer visualization parameters are selected in response to gestures applied to the client device.

8. The computer of claim 1 wherein the panorama parameters define a panoramic thought balloon.

9. The computer of claim 1 wherein the panorama parameters define a frame in a multiple frame authored work.

10. The computer of claim 1 wherein the cube faces are selected from rectangular, cubic and spherical formats.

* * * * *